United States Patent [19]
Hu et al.

[11] Patent Number: 6,018,380
[45] Date of Patent: Jan. 25, 2000

[54] LCD HAVING TRENCH FORMED ON THE SUBSTRATE(S) TO STOP SEALING MATERIAL FLOWING TO DISPLAY AREAS

[75] Inventors: Dyi-Chung Hu, Hsinchu Shein; Hung-Ming Lee; Tai-Kang Wu, both of Hsinchu; Sywe N. Lee, Taipei; Sheng-Heisn Lin, Tainan Hsien; Ching-Chung Tsai, Nantou; Hung-Chien Kuo, Taichung Hsien; Chung-Jen Chen, Hsinchu, all of Taiwan

[73] Assignee: Prime View International Co., Hsinchu, Taiwan

[21] Appl. No.: 08/922,259

[22] Filed: Sep. 2, 1997

[51] Int. Cl.[7] .................. G02F 1/1339; G02F 1/1333
[52] U.S. Cl. .................. 349/153; 349/155; 349/158; 349/84
[58] Field of Search .................. 349/153, 154, 349/155, 84, 158

[56] References Cited

U.S. PATENT DOCUMENTS

| | | | |
|---|---|---|---|
| 443,063 | 4/1890 | Nishiyama | 349/153 |
| 4,610,510 | 9/1986 | Funada et al. | 349/153 |
| 4,820,025 | 4/1989 | Nakanowatari | 349/153 |
| 5,220,446 | 6/1993 | Rho | 349/155 |
| 5,477,361 | 12/1995 | Yangagi | 349/153 |
| 5,572,345 | 11/1996 | Yamazaki et al. | 349/84 |
| 5,808,719 | 9/1998 | Fujiwara et al. | 349/157 |

FOREIGN PATENT DOCUMENTS

06-160865  6/1994  Japan.

Primary Examiner—William L. Sikes
Assistant Examiner—Toan Ton
Attorney, Agent, or Firm—H. C. Lin Patent Agent

[57] ABSTRACT

A liquid crystal display device having a sealing material close to display area while maintaining a uniform liquid crystal cell gap is disclosed. The liquid crystal display comprises two transparent electrode substrates having a trench near the display area to stop the sealing material overflowing to display pixels. Thus, the effective display area of a liquid crystal display device is increased by dispensing a sealing material to a trench area at a predetermined position surrounding the display area. A spacer used in the sealing material is larger in size than that used in the display area to compensate the depth of the trench. After the liquid crystal is injected into the space surrounded by the substrates and a sealing material, a uniform liquid crystal cell gap over the entire display area is obtained. The liquid crystal display device thus obtained results in a closer distance between the sealing material and display area without any unevenness in color over the entire display area, and lends itself very useful as unit display device or as one of the panels in a tiled liquid crystal display device.

14 Claims, 9 Drawing Sheets

LCD HAVING TRENCH FORMED ON THE SUBSTRATE(S) TO STOP SEALING MATERIAL FLOWING TO DISPLAY AREAS

BACKGROUND OF THE INVENTION

Figure 1:
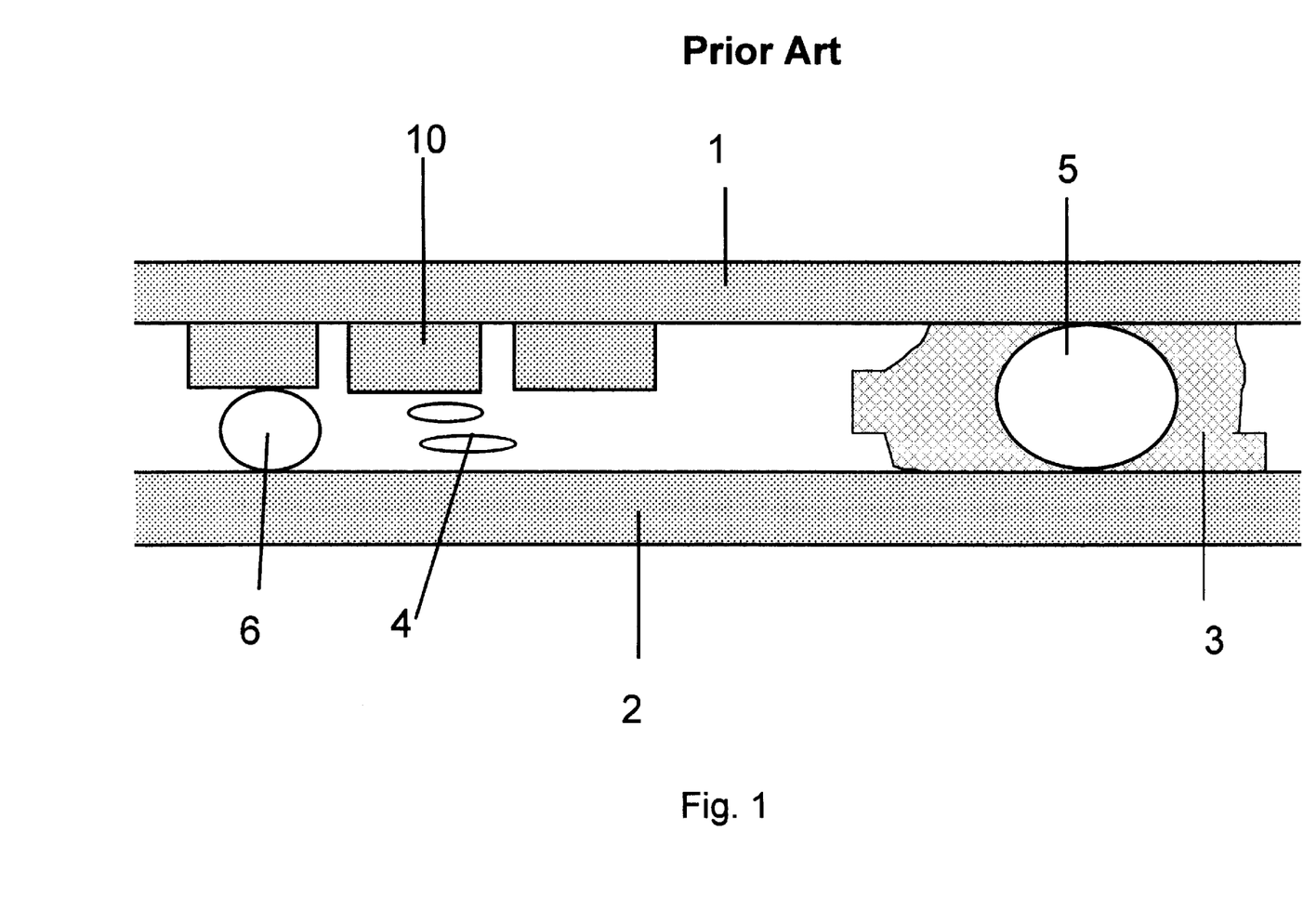
FIG. 1 is a schematic side view showing a liquid crystal display device with a sealing material located far from the outmost display area.
Figure 2:
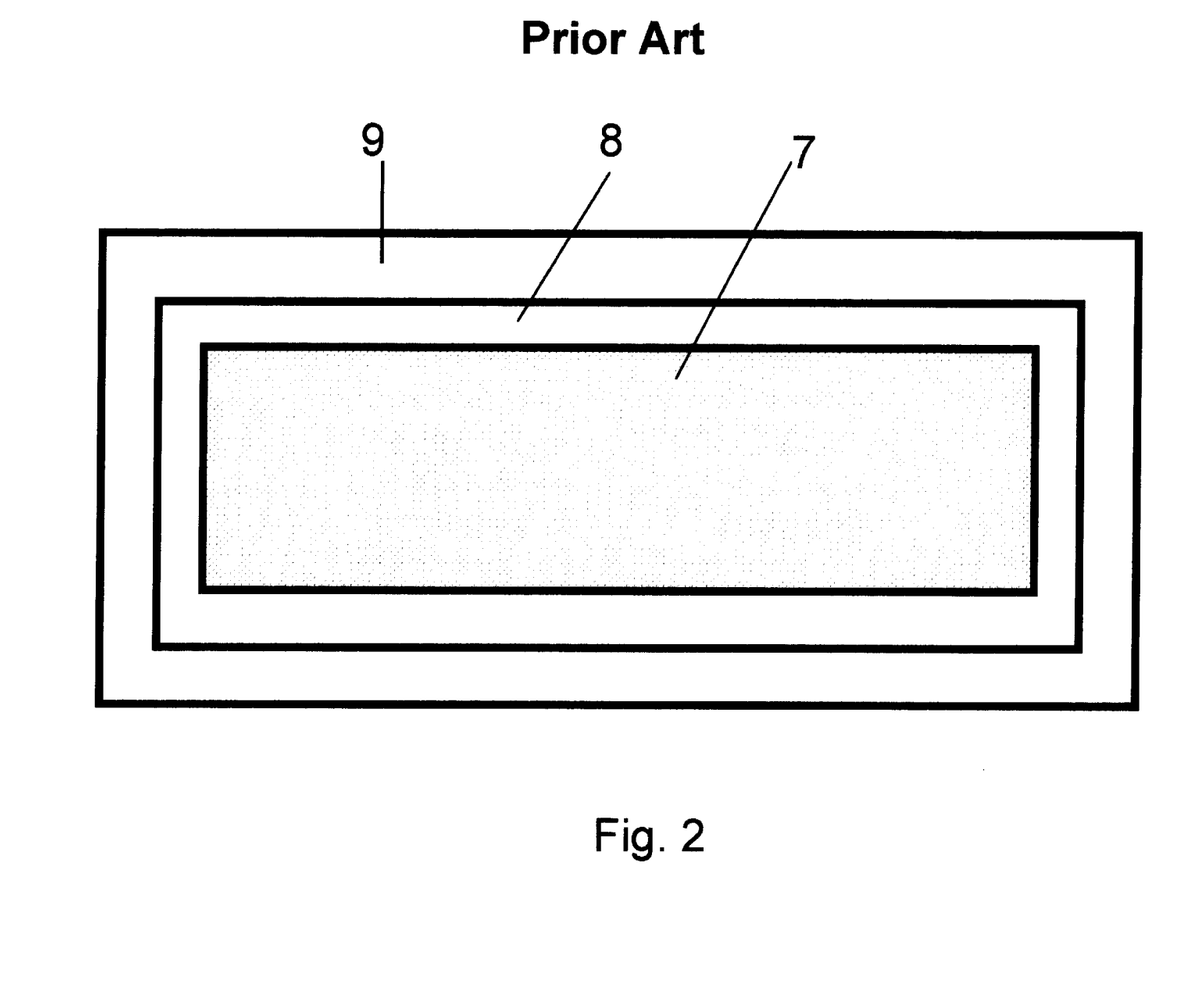
FIG. 2 is a schematic top view showing a liquid crystal display cell with a non-display area between an epoxy sealing area and a display area.

Liquid crystal display (LCD) devices are now widely used in commercial products. As shown in FIG. 1, a liquid crystal display is composed of two transparent electrode substrates, a top substrate 1 and a bottom substrate 2, arranged opposite to each other and fixed with respect to each other with a sealing material 3. Liquid crystal materials 4 are then injected into a space formed by a sealing material with a spacer 5 separating the two transparent substrates. A spacer 6 dispersed on the display area is used to maintain a uniform liquid crystal cell gap between the two glass substrates. In order to maintain a uniform liquid crystal cell gap distribution and to prevent the display area edge from a non-uniform liquid crystal cell gap distribution and to prevent picture elements from overlapping the sealing material, the sealing material is dispersed or printed onto the substrate far from the display area. As shown in FIG. 2, a liquid display fabricated from the prior art is composed of a viewing area 7, a non-viewing area 8 and a sealing material area 9. Even though a color uniform display without any sealing overlapping with the display pixel 10 can be obtained from the prior art, a substantial area which is not utilized as a viewing area has to be sacrificed. A commercial liquid crystal display has been manufactured by the above conventional method and technology.

Figure 3:
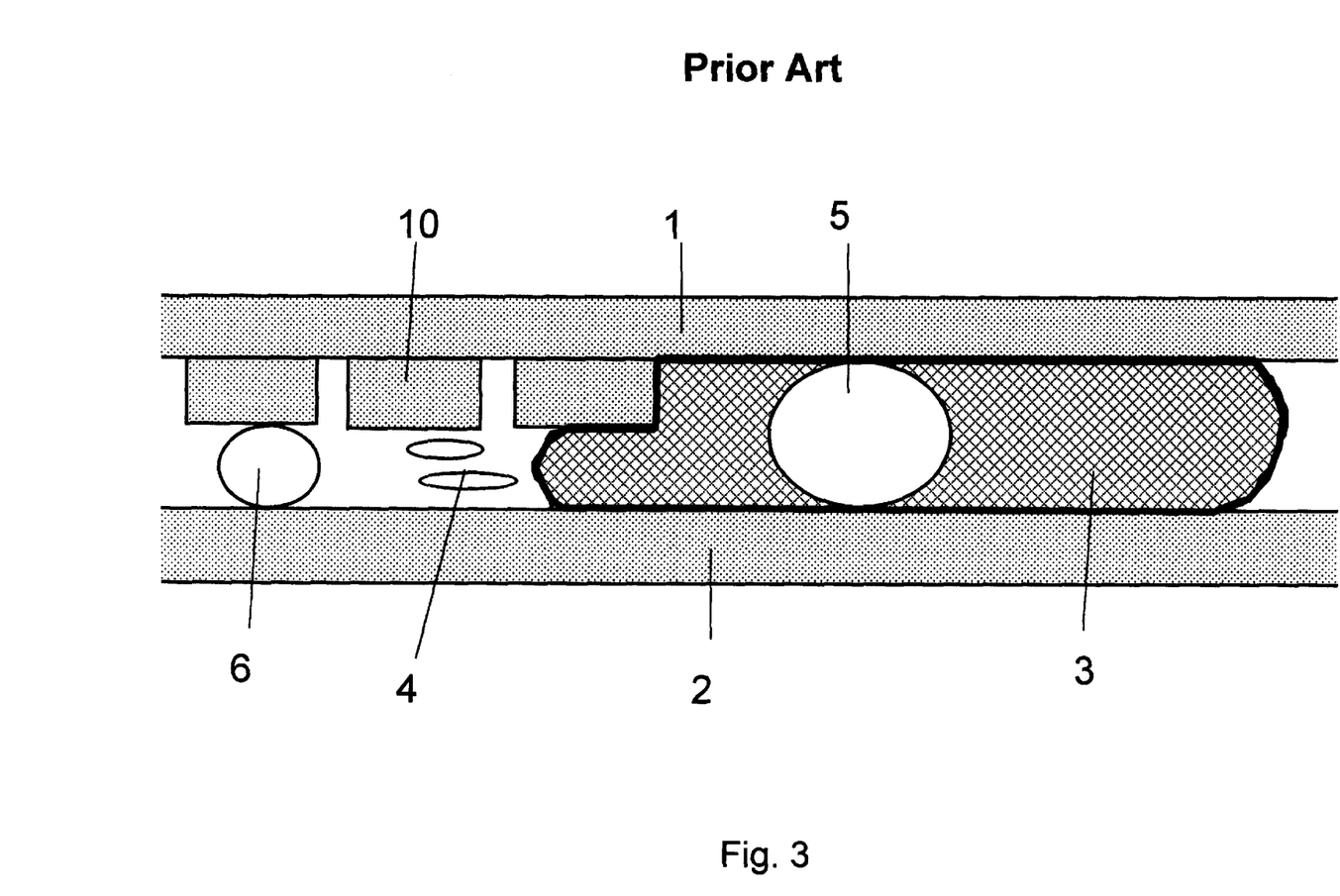
FIG. 3 is a schematic side view showing a liquid crystal display cell with an epoxy seal on the pixel after cell assembly.
Figure 4:
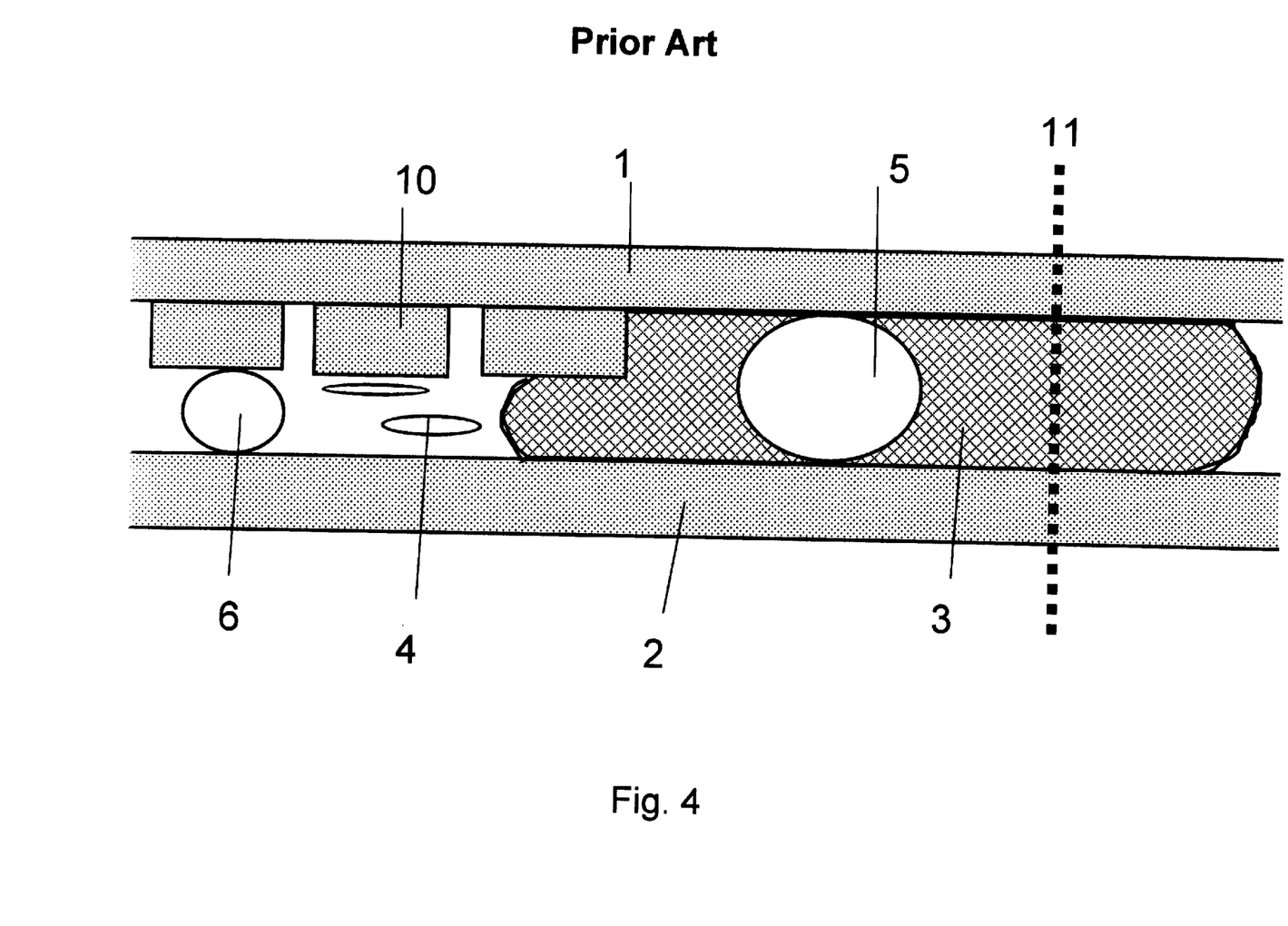
FIG. 4 is a schematic side view showing an assembled liquid crystal display cell to be cut along the trimming line.
Figure 5:
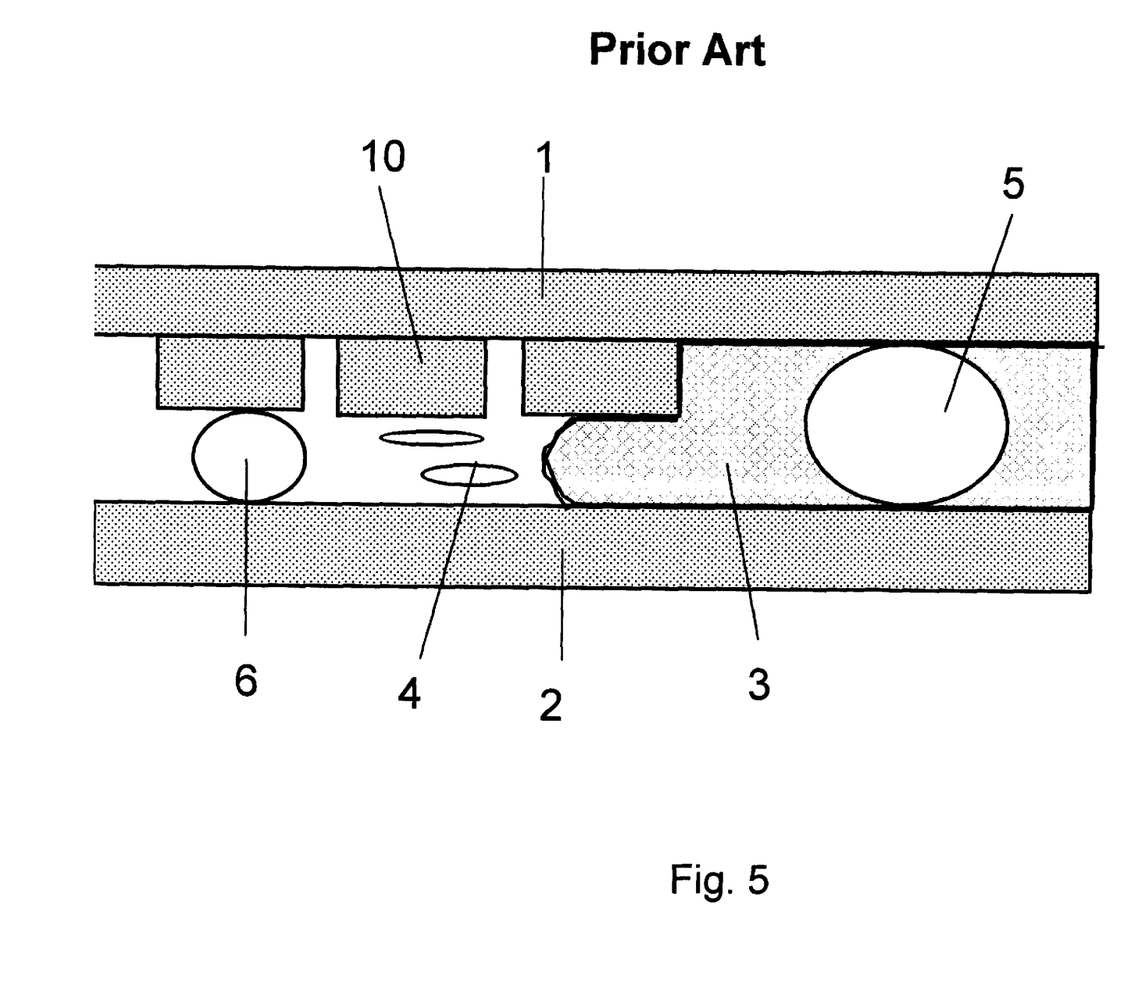
FIG. 5 is a schematic side view showing the liquid crystal display cell made from conventional design after glass trimming.

Recently, there is a demand in increasing the effective display area without increasing the display panel size. Also, large area direct-view LCDs are playing an important role as a means of sharing information with people. However, several problems, such as high signal line resistance, low mobility of amorphous Si, low yield, and uneven color over the edge of the display area, occur in manufacturing large viewing area displays. One way to form a large display area is disclosed in U.S. Pat. No. 4,832,457 by combining multiple panels. When a liquid crystal display device is used in the prior art, it has to be cut through cured sealing material at a predetermined position. If a sealing material is placed too far from the outermost display pixel, a weak seal or no sealing material along the cut edge would result in a liquid crystal leakage. In order to form a seamless display, the sealing material has to be dispensed at the place as close as possible to the display area. The distance between the outermost pixel and the sealing material is about 30–60 $\mu$, m. Hence, there is only a small distance of 30–60 $\mu$m for placing the sealing material. These requirements limit the manufacturing possibility since it is difficult to control the flow of a sealing material during the curing step in the conventional assembly process. A sealing material overflowing to display area results in blocked display image at the place where the sealing material overlaps with the dispaly pixels. The flow of the sealing material is affected by the viscosity and the amount of the sealing material, spacer type and density in the sealing material, heating condition in curing sealing material, and compression force. Therefore, only a low yield product can be obtained by carefully controlling the above factors in a conventional manufacturing technology. FIG. 3 illustrates a schematic side view of a portion of a liquid crystal device with display pixel 10 overlapping with sealing material 3 as manufactured by poor art. As shown in FIG. 4, display device has to be cut through the sealing material along with a glass trimming line 11 for using the device as a panel in multiple-panel application. FIG. 5 illustrates a schematic side view of a cut display device for the multiple-panel application. Even though there is no problem in liquid crystal leakage for the cut display device shown in FIG. 5, the device cannot be used as a unit panel in the application since no optical image is performed at the place where display pixels are covered with sealing material.

SUMMARY

An object of the present invention is to provide a liquid crystal device having a seal close to the display pixels. Another object of the present invention is to provide a liquid crystal display device capable of attaining a uniform liquid cell gap without unevenness in color over the entire display area. A further object of the inventions to provide a method for producing a liquid crystal device having a uniform color image over the display area adjacent to a sealing material. These objects are achieved in this invention by using a glass substrate with a trench near the display area, and using a spacer with a larger size in the sealing material than a spacer in the display area.

DETAILED DESCRIPTION OF THE PREFERRED EMBODIMENT

Figure 6:
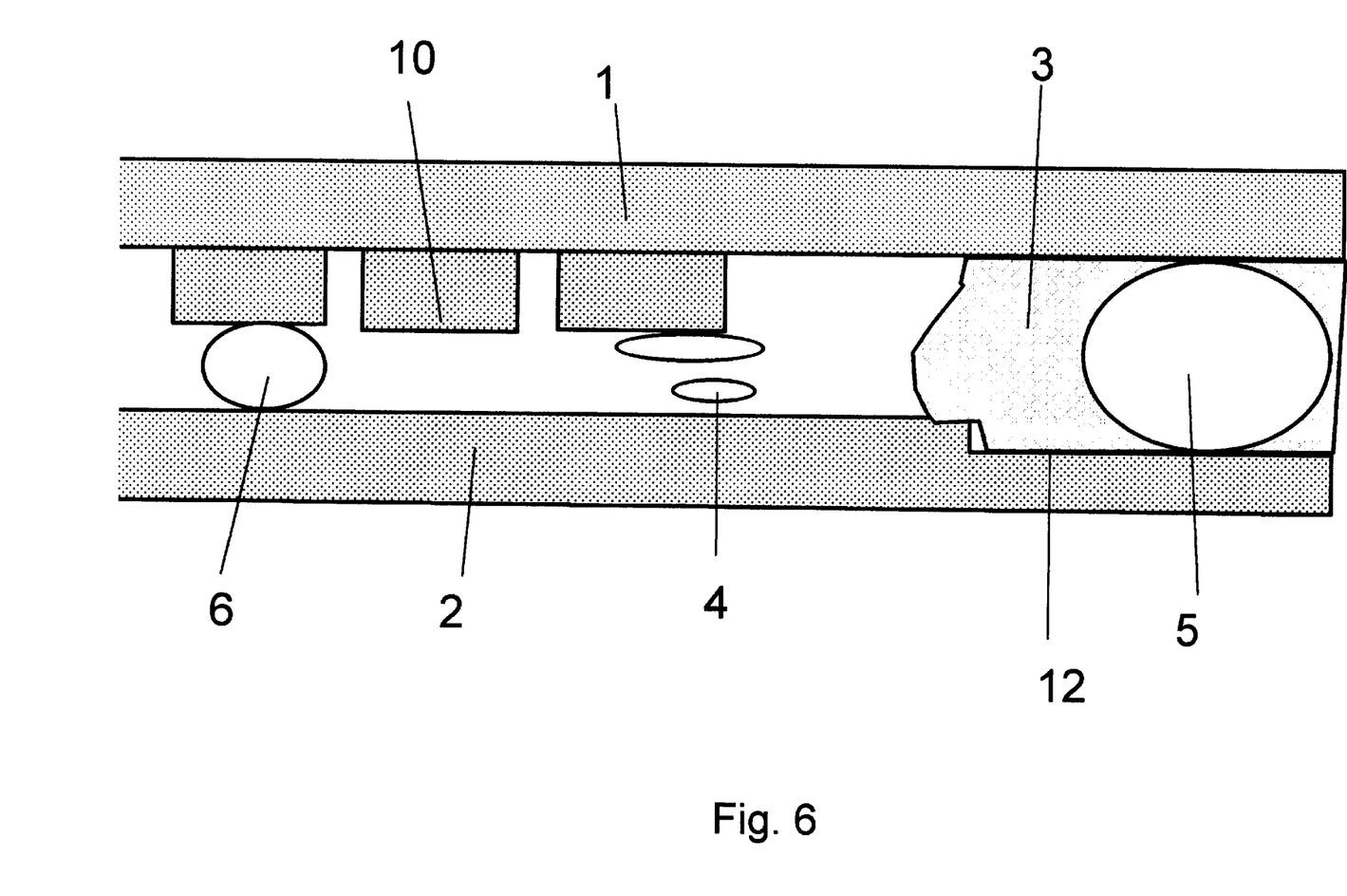
FIG. 6 is a schematic side view showing the first embodiment of the liquid crystal display with trench structure on the bottom glass substrate.
Figure 7:
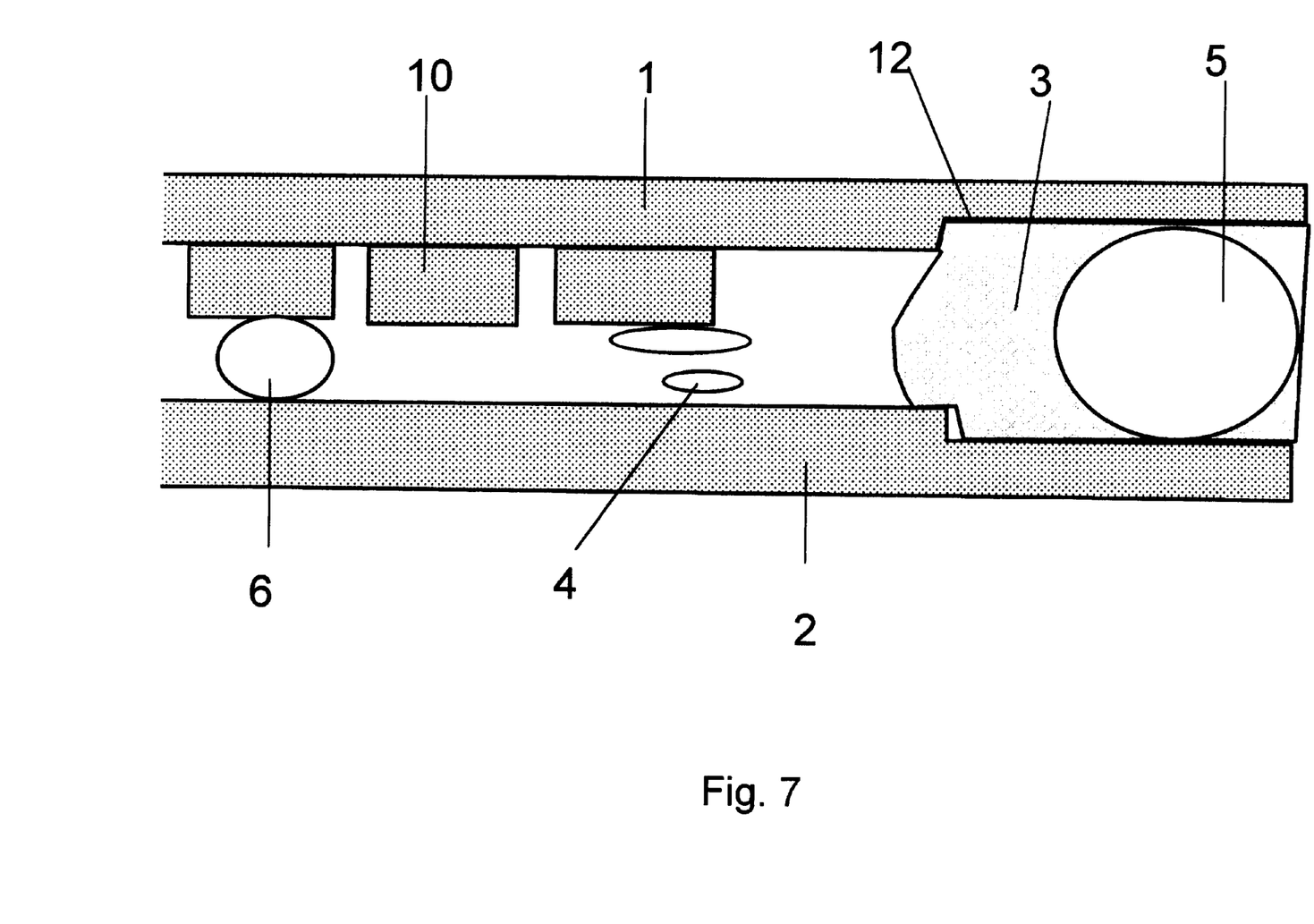
FIG. 7 is a schematic side view showing a second embodiment of the liquid crystal display cell with trench structure on both the bottom glass substrate and the top glass substrate.
Figure 8:
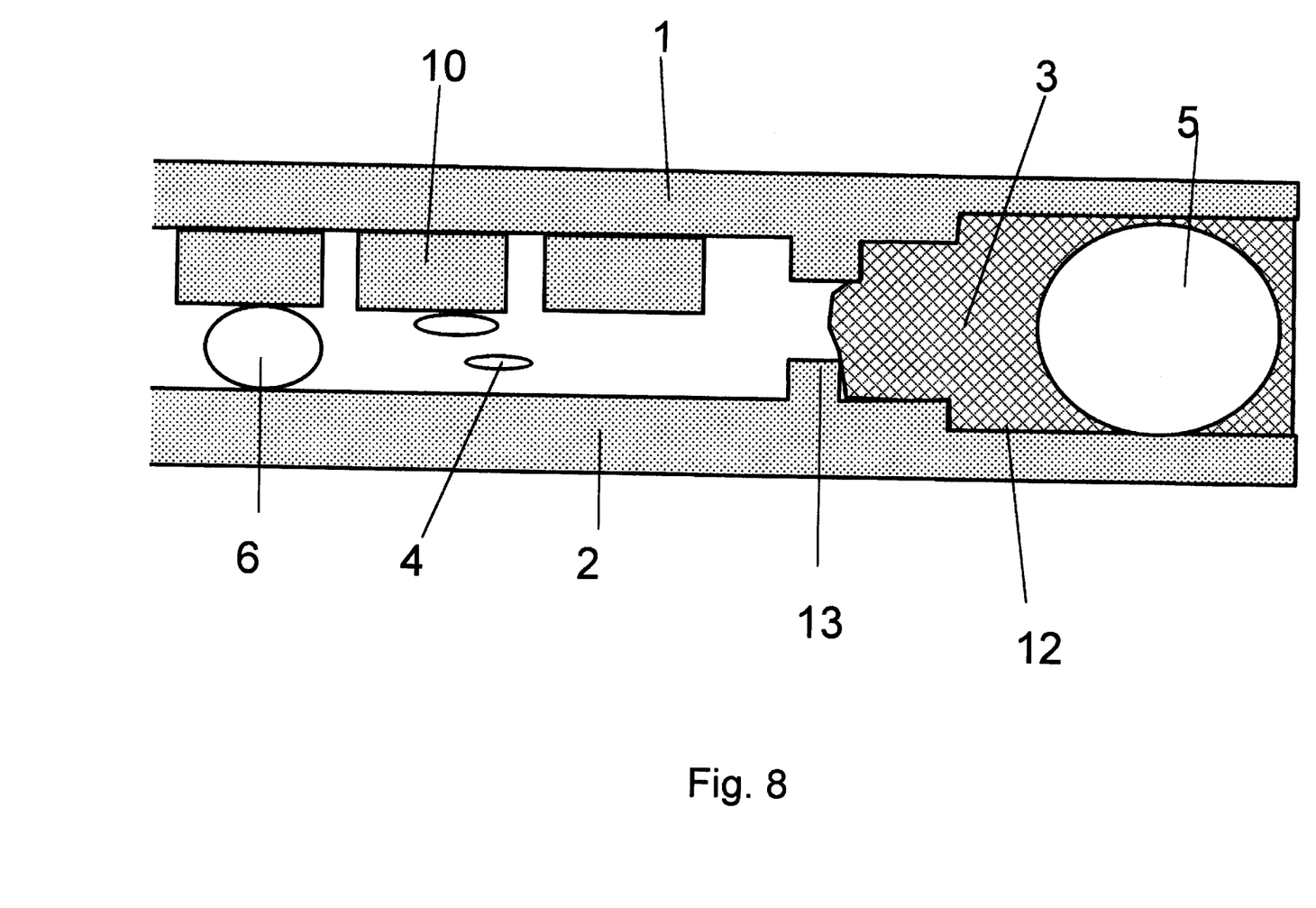
FIG. 8 is a schematic side view showing a third embodiment of the liquid crystal cell with a trench and rib structure on both the bottom glass substrate and the top glass substrate.

FIGS. 6, 7 and 8 illustrate schematic side views of this invention, showing a portion of a liquid crystal device. The use of three display pixels 8, 9, 10 representing a color filter of three elements—red, green and blue—in FIGS. 6, 7 and 8 is for the ease in illustrating this invention. The liquid crystal cells described in FIGS. 6, 7 and 8 are assembled by a typical liquid crystal display manufacturing process illustrated below, except that the spacer size in the sealing material is larger than the spacer size in each liquid crystal display area.

A liquid crystal display device comprises two transparent substrates, which contain electrodes. A substrate 1 is a color filter substrate, and a substrate 2 is thin film transistor substrate. These two substrates are arranged in parallel opposite to each other with a liquid crystal mixture 4 filling in-between. The transparent electrodes, which are electrically conductive layers, can be deposited by a sputtering method, a vapor deposition method or a coating method. The surface of the transparent electrodes is coated with a layer of polyimide alignment film (not shown in FIGS. 6, 7 and 8) by spin coating method or a roller coater for aligning the liquid crystals to a correct direction. The alignment film may include a film of organic film, such as polyimide, polycarbonate, cellulose resin and acrylic resin. A preferred alignment layer is a polyimide film deposited by coating with a roller coater either a polyimide solution or a polyamic acid solution to the substrates containing the transparent electrode. A preferred thickness of polyimide alignment film is in the range of 600 to 900 Å. The substrates containing the alignment films are then treated with rubbing process at a predetermined direction to align the liquid crystal at a typical direction. A smaller size spacer 6 is dispersed onto the surface of one of the two substrates while a sealing material 3 containing a larger size spacer 5 is screen-printed onto the surface of the other substrate to form a sealing structure with an open hole through which a liquid crystal can later be injected. After two substrates are precisely aligned to each other and fixed by curing the sealing material, the individual display cell can be separated by either the scribing and breaking method or dicing as is commonly used in conventional liquid crystal display cell fabrication. Then, a liquid crystal 4 is injected through the open hole into the cut liquid crystal cell in the vacuum chamber by using a capillary effect. The open hole is later sealed by UV-curable sealing material.

To obtain a liquid crystal cell with a uniform color image, the spacer 6 dispersed in the display area is smaller in size than the spacer mixed in the sealing material. A bigger size spacer 5 mixed in the sealing material is used to compensate for the gap spacing due to the trench being etched out from the substrates. These spacers can be made of glass fiber, glass bead and plastic bead. The trench depth can be in the range of 0.1 $\mu$m to 1.5 $\mu$m, depending on the liquid crystal display cell design. There is no limitation in the width of the sealing line in this invention. A preferred sealing width is in the range of 0.7 to 1.2 mm. The spacer beads may be dispersed by a spraying method or a spinner method at a density of 80–500 beads/mm$^2$.

Embodiment 1 (FIG. 6):—A display device in this embodiment of the invention contains a top glass substrate 1 with display pixel 10 opposite to a bottom glass substrate 2 with a trench structure.

Embodiment 2 (FIG. 7):—The display device in this embodiment includes a top glass substrate 1 opposite to a bottom glass substrate 2 has a trench on both the glass substrates.

Embodiment 3 (FIG. 8):—The display device includes a top glass substrate 1 opposite to a bottom glass substrate 2 has a trench and a rib structure 13 on both glass substrates to prevent the flow of sealing material from encroaching the gap spacing underneath a display pixel.

Figure 9:
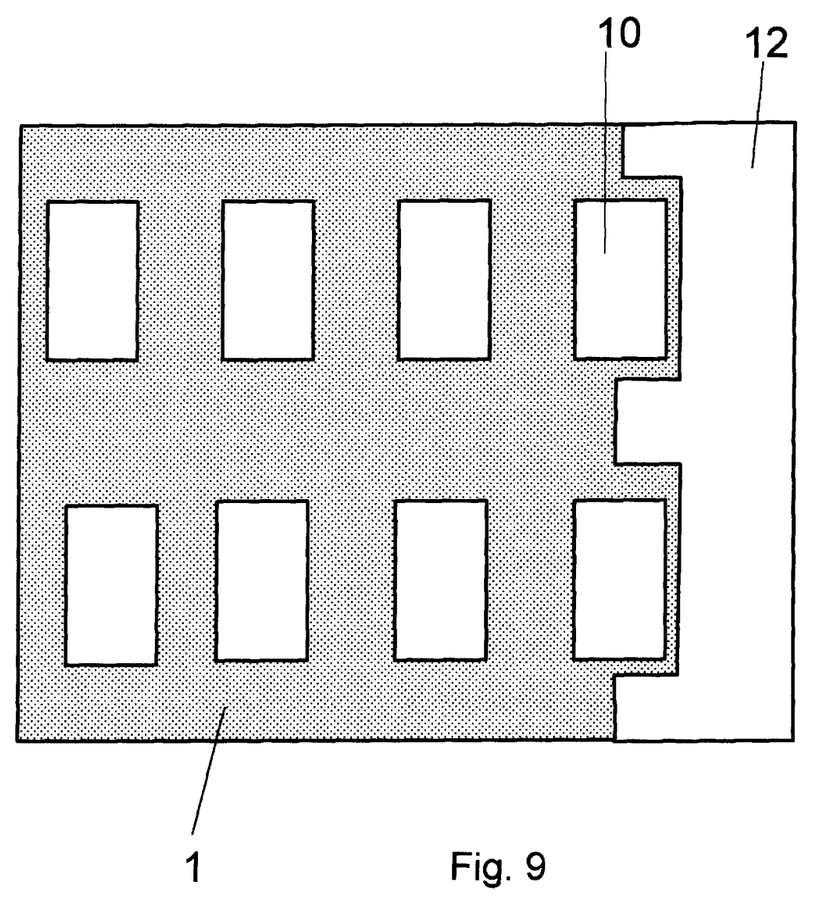
FIG. 9 is a schematic top view showing a design of a trench area adjacent to display pixel on the top glass substrate.

The above-mentioned trench and rib structures near the display area can be designed at the place where a sealing material close to the display area is needed, as shown in FIG. 9 having design of trench area 12 adjacent to a display pixel 10 on the glass substrate 1. Therefore, the sealing material can be stopped by the trench and flows against the display pixel or to place in between two display pixels. The trench can be formed by etching or by mechanical grinding into the transparent substrates 1 and/or 2, which are made of silicon nitride, indium tin oxide glass and other material which are used in making transparent electrodes or passivation film.

For comparison, several liquid display devices were prepared in the same manner as described in the above procedure except that a spacer size in the sealing material is different and whether the substrate contains a trench or not. The trench was formed by a photolithography technology to etch out the silicon nitride passivation from the thin-film transistor (TFT) substrate. The processing conditions and the results of the display device thus form below:

|  |  | Prior art | Example 1 | Example 2 |
|---|---|---|---|---|
| Process conditions | trench on the substrate | no | yes | yes |
|  | trench depth ($\mu$m) | — | 0.5 | 0.5 |
|  | spacer size on the display area ($\mu$m) | 5.25 | 5.25 | 5.25 |
|  | spacer size in sealing material ($\mu$m) | 5.00 | 5.00 | 7.00 |
| Result of device | cell gap uniformity | poor | poor | good |
|  | pixels covered with sealing material | yes | no | no |

The invention described herein provides a method for a liquid crystal device to have a uniform image over the entire area including the area close to the sealing material. A method according to the present invention for producing a liquid crystal display device includes a trenched bottom glass substrate together with a top glass substrate through a sealing material and a liquid crystal interposed between the two substrates. The steps include: dispensing a sealing material mixed with a larger size spacer to the top glass substrate at a certain position with precise control, dispensing a smaller size spacer for determining a liquid crystal cell gap between two substrates onto a bottom glass substrate, and assembling the two substrates with an accuracy alignment followed by curing the sealing material.

What is claimed is:

1. A liquid crystal display device having liquid crystal sandwiched between a top transparent substrate and bottom transparent substrate, comprising:
   a sealing material containing first spacers surrounding said liquid crystals which constitutes display picture elements (pixels),
   second spacers dispersed in display areas where said pixels reside, at least one trench formed on one of said top transparent substrate and said bottom transparent substrate to stop said sealing material from flowing to said display areas.

2. A liquid crystal display device as described in claim 1, wherein said sealing material is dispensed by any one of a printing method and a syringe dispensing method.

3. A liquid crystal display device as described in claim 1, wherein said sealing material is any one of a ultraviolet-curing seal and a heat-curing seal.

4. A liquid crystal display device as described in claim 1, wherein said trench is formed on said top transparent substrate.

5. A liquid display device as described in claim 1, wherein said trench is formed on both said top transparent substrate and said bottom transparent substrate.

6. A liquid crystal display device as described in claim 1, wherein said trench is formed by using an etching method.

7. A liquid crystal display device as described in claim 1, wherein said trench is formed by using a mechanical method, such as grinding.

8. A liquid crystal display device as described in claim 6, wherein the materials for said top transparent substrate and said bottom transparent substrate are selected from a group consisting of silicon nitride, indium tin oxide, glass, and other materials used in making transparent electrode.

9. A liquid crystal display device as described in claim 1, wherein said first spacer dispersed in said sealing material is selected from a group consisting of glass fiber, glass bead and plastic bead.

10. A liquid crystal display device as described in claim 1, wherein said second spacer dispersed in said display area is selected from a group consisting of glass bead and plastic bead.

11. A liquid crystal display device as described in claim 1, wherein said first spacer used in said sealing material is larger in size than said second spacer used in said display area.

12. A liquid crystal display device as described in claim 1, wherein one said trench is formed in said bottom transparent substrate and a second trench is formed in said top transparent substrate.

13. A liquid crystal display device as described in claim 12, wherein a rib is erected between said one said trench and said display area, and a second rib is erected between said second trench and said display area.

14. A liquid crystal display device as described in claim 1, wherein said transparent substrate is glass.

* * * * *